United States Patent
Martin

[15] 3,693,534
[45] Sept. 26, 1972

[54] COOKING DEVICE

[72] Inventor: Norman L. Martin, Lake Quivira, Kans.

[73] Assignee: Locke Stove Company, Kansas City, Mo.

[22] Filed: May 26, 1971

[21] Appl. No.: 147,236

Related U.S. Application Data

[63] Continuation of Ser. No. 54,212, July 13, 1970, abandoned.

[52] U.S. Cl. .................99/260, 99/339, 99/343, 99/400, 99/421 H, 99/446, 126/25 R
[51] Int. Cl. .................................B30b 15/00
[58] Field of Search ....126/25, 41; 99/259, 260, 339, 99/352, 343, 400, 444, 446, 421 H

[56] References Cited

UNITED STATES PATENTS

| | | | |
|---|---|---|---|
| 2,180,868 | 11/1939 | Dunning et al. | 99/444 UX |
| 2,323,821 | 7/1943 | Lindemann et al. | 126/41 X |
| 2,520,578 | 8/1950 | Treloar | 99/339 X |
| 2,860,568 | 11/1958 | Magee | 99/339 |
| 3,016,816 | 1/1962 | Persinger et al. | 99/339 |
| 3,333,526 | 8/1967 | Kirkpatrick | 99/260 |
| 3,386,432 | 6/1968 | Hanson | 126/41 |
| 3,474,724 | 10/1969 | Jenn | 99/259 |
| 3,552,301 | 1/1971 | McNeff | 126/25 X |
| 3,605,718 | 9/1971 | Winters | 126/25 R |

Primary Examiner—Billy J. Wilhite
Attorney—Fishburn, Gold and Litman

[57] ABSTRACT

A cooking device for outdoor use comprises a base unit having bottom and side walls defining a plurality of side-by-side compartments each having an open top with each bottom wall having a plurality of passages therethrough to provide a source of combustion air for fuel burners in the respective compartment. Each compartment has a cover with a portion thereof hingedly mounted for opening and closing same with the covers having a flue passage therethrough for improved draft characteristics. At least one of the compartments has a bake chamber therein.

17 Claims, 5 Drawing Figures

PATENTED SEP 26 1972

INVENTOR.
Norman L. Martin
BY
Fishburn, Gold & Litman
ATTORNEYS

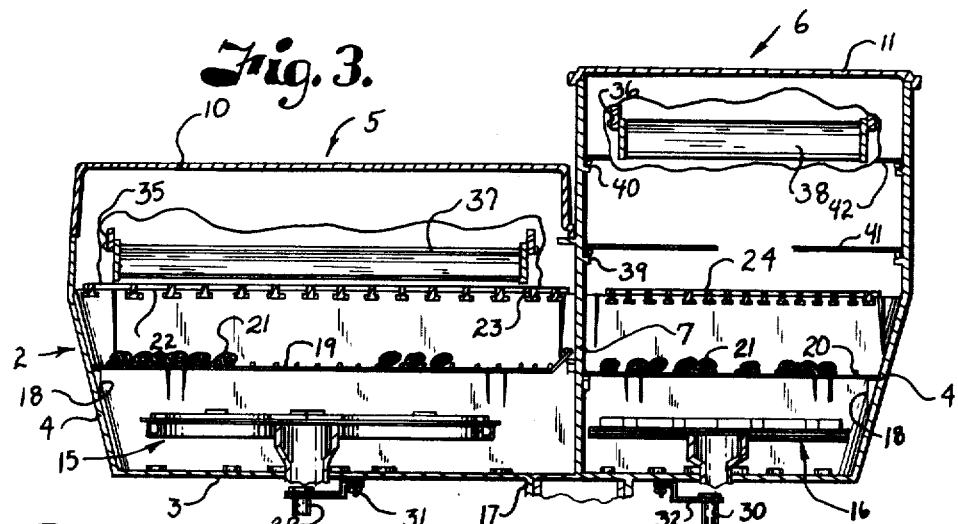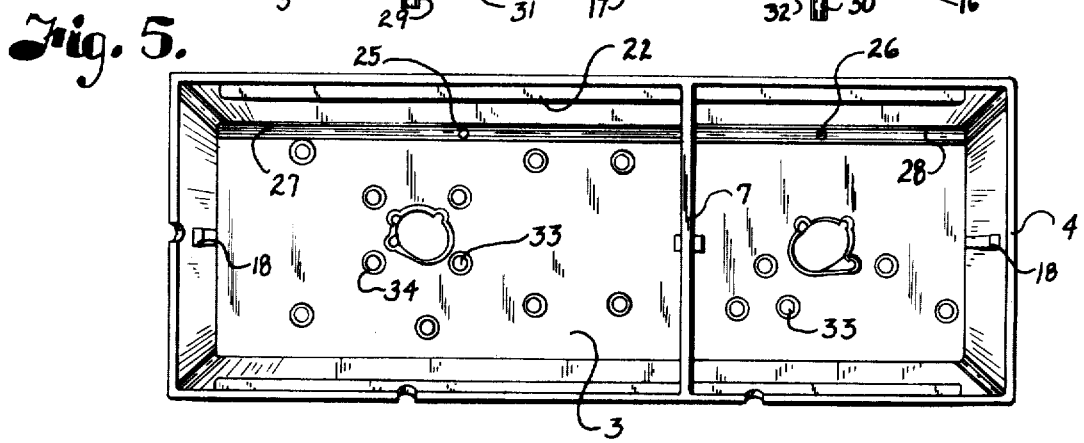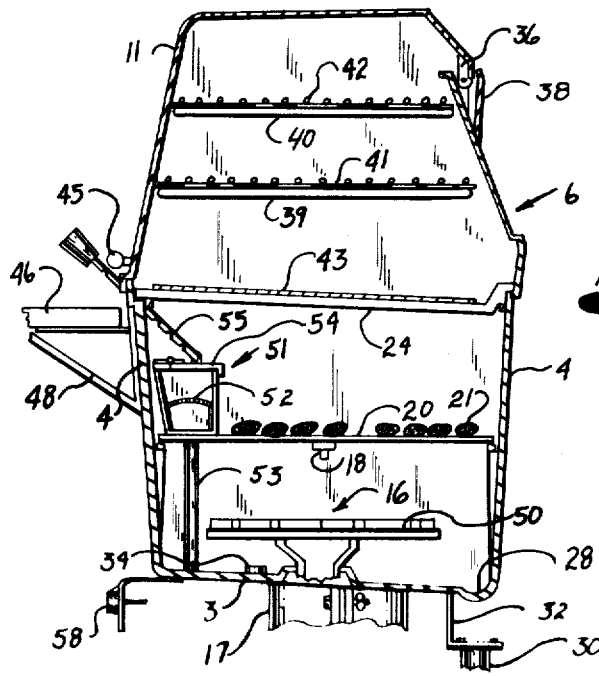

3,693,534

COOKING DEVICE

This application is a continuation of application, Ser. No. 54,212, filed July 13, 1970, now abandoned.

The present invention relates to cooking devices and more particularly to a cooking device having a plurality of side-by-side compartments with at least one of the compartments having a bake chamber therein.

The principal objects of the present invention are: to provide a cooking device particularly adapted for outdoor use which is versatile in use and has a plurality of side-by-side compartments and which is adapted for grilling, baking, barbecuing ribs and the like; to provide such a cooking device having improved operation for cooking small or large quantities of food; to provide such a cooking device having improved draft characteristics; to provide such a cooking device having a smoke producing device within at least one of the cooking compartments to thereby prepare smoked food, such as meat, fish, poultry, beef ribs and the like; to provide such a cooking device having means therein to cause grease drippings, condensed moisture, and the like to follow a prescribed flow path to an accumulating channel or trough from which the liquid may flow through outlets to a collector placed beneath the cooking device; and to provide such a cooking apparatus which is durable and weather-proof, easy to operate, economical to manufacture, and particularly well adapted for the proposed use.

Other objects and advantages of this invention will become apparent from the following description taken in connection with the accompanying drawings wherein are set forth by way of illustration and example, certain embodiments of this invention.

FIG. 3 is a longitudinal sectional view through the cooking device taken on line 3—3, FIG. 2.

FIG. 4 is a transverse sectional view through the cooking device taken on line 4—4, FIG. 2, showing a bake chamber within one compartment of the cooking device.

FIG. 5 is a plan view of the bottom wall of the cooking device showing combustion air inlets and a grease drain for each compartment.

Figure 1:
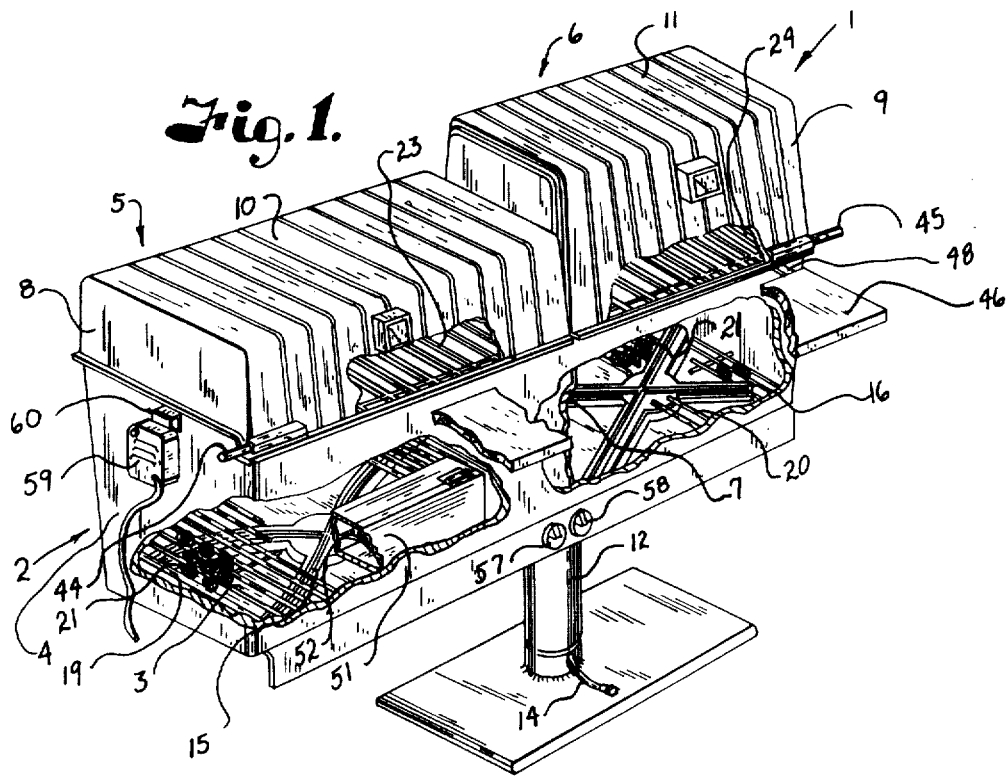
FIG. 1 is a perspective view of a cooking device embodying features of the present invention with portions broken away to better illustrate the component parts.
Figure 2:
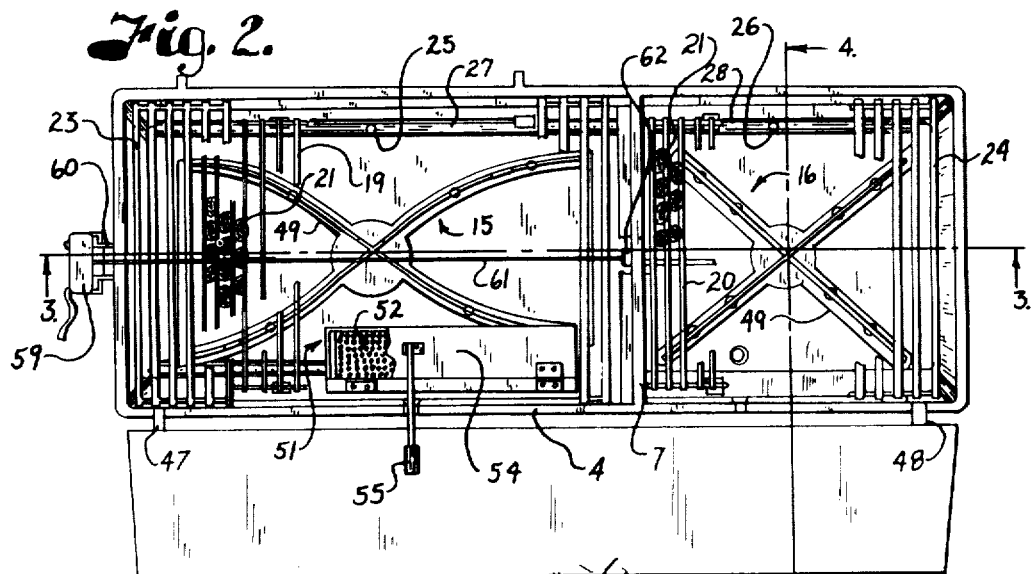
FIG. 2 is a plan view of the cooking device.

Referring more in detail to the drawings:

The reference numeral 1 generally designates a cooking device particularly adapted for outdoor use, such as adjacent a patio, picnic area, or the like. The cooking device 1 has a base unit 2 having a bottom wall 3 and a plurality of side walls 4 extending upwardly therefrom to define a plurality of side-by-side compartments.

In the illustrated structure, the cooking device 1 has a pair of cooking compartments 5 and 6 separated by a partition 7 extending upwardly from the bottom wall 3. The compartments 5 and 6 have covers 8 and 9 respectively with the covers 8 and 9 having hingedly mounted portions 10 and 11 respectively which are movable between a closed position and an open position. The cooking device 1 includes a tubular standard 12 which may be permanently installed in or adjacent a patio, or the like, as by having the standard 12 secured in position outdoors, for example having the lower end thereof embedded in a concrete foundation within or adjacent a patio.

If it is desired that the cooking device 1 be portable, the tubular standard 12 may have the lower end thereof secured to a suitable base or support member which is adapted to be positioned on a patio, porch, or the like, or the base or support member may be mobile and adapted to be moved to a desired location.

Within the tubular standard 12 are a plurality of conduits or pipes 14 each adapted to have one end thereof connected to a source of suitable gaseous fuel (not shown) and the conduits or pipes 14 are each adapted to have the other end connected to fuel burners 15 and 16 in the cooking compartments 5 and 6 respectively. The cooking device 1 includes a sleeve 17 depending from the bottom wall 3 and the sleeve 17 is adapted to be removably mounted on an upper end of the tubular standard 12.

The fuel burners 15 and 16 are each operative to produce a continuous flame area when fuel sheets extending therefrom are ignited. In the illustrated burners, each of the fuel burners 15 and 16 have a plurality of arms each having a substantially continuous fuel port to thereby produce a continuous flame area when fuel sheets extending therefrom are ignited.

When cooking many food items all of which are to be served substantially at the same time, it is necessary to maintain some food items warm, such as vegetables, while cooking other items, such as meat, therefore, the food items to be maintained at a warm temperature are placed in one of the cooking compartments while the other items are being cooked in the other cooking compartment. The partition 7 between the compartments 5 and 6 is a heat radiating metal which will radiate sufficient heat into the one compartment to maintain the food items therein at a warm temperature until the complete meal is prepared.

It is noted that the partition 7 will radiate sufficient heat to preheat one cooking compartment when the other cooking compartment is heated to cook food therein whereby cooking in the preheated compartment is substantially more economical.

Facing surfaces of the side walls 4 of the cooking compartments 5 and 6 have shoulders 18 arranged in aligned pairs to support briquette racks 19 and 20, in the cooking compartments 5 and 6 respectively. The briquette racks 19 and 20 are adapted to support a suitable noncombustible heat absorbing and radiating material, such as ceramic charcoal pieces or chips 21 which are heated by the burners 15 and 16 respectively.

Spaced above the shoulders 18 are shoulders 22 for supporting food supporting grids 23 and 24 in the cooking compartments 5 and 6 respectively. The food supporting grids 23 and 24 are each spaced above the briquette racks 19 and 20 respectively and the ceramic briquettes 21 thereon with the spacing between the briquettes 21 and the grids 23 and 24 being such that flash burning of grease dripping from meat placed on the grids 23 and 24 will not engage said meat. It is noted that the briquettes 21 are self-cleaning and do not effect the flavor of food cooked within the compartments 5 and 6. Flavor is effected from smoke from juices dripping onto glowing briquettes.

It is desirable to provide a positive disposal of excess grease formed by cooking meat on the grids 23 and 24, therefore, an intermediate portion of each of the grids 23 and 24 is sloped to direct grease toward one of the side walls 4, preferably toward the rear of each of the cooking compartments 5 and 6. The bottom wall 3 of the base unit 2 has grease drains 25 and 26 within the cooking compartments 5 and 6 respectively. The bottom wall 3 has ways or troughs 27 and 28 in the cooking compartments 5 and 6 respectively with the troughs 27 and 28 being shaped to direct grease collected therein toward the respective grease drains 25 and 26.

It is desirable to collect the grease flowing through the drains 25 and 26 to thereby prevent the grease from falling onto a patio, porch or other surface, therefore, grease receptacles 29 and 30 are provided below the grease drains 25 and 26 and supports 31 and 32 are movably mounted on the base unit 2 for supporting the grease receptacles 29 and 30 respectively and for pivotally moving same between a position below the respective grease drain and a position spaced from the base unit 2 whereby the respective receptacle may be removed, emptied, cleaned and reinstalled.

It is desirable to provide a source of combustion air within the cooking compartments 5 and 6 to support combustion of the fuel burners 15 and 16, therefore, the bottom wall 3 has a plurality of air passages 33 extending therethrough for each of the compartments 5 and 6. It is desirable to provide means on the bottom wall 3 at each of the air passages 33 to prevent grease on the bottom wall 3 from entering the air passages 33, therefore, tubular portions 34 extend upwardly from each of the air passages 33 to prevent grease on the bottom wall 3 from flowing into and through the air passages 33.

It is desirable to provide means permitting escape of smoke and fumes from each of the compartments 5 and 6, therefore, the covers 8 and 9 have hinges 35 and 36 respectively with the hinges 35 and 36 being substantially above the food supporting grids 23 and 24 within the cooking compartments 5 and 6 respectively. The hingedly mounted portions 10 and 11 of the covers 8 and 9 respectively are shaped to provide a flue passage therethrough adjacent the hinges 35 and 36.

Particularly for outdoor use, it is desirable to provide wind deflection plates 37 and 38 having one edge connected to the side walls 4 and extending outwardly therefrom and having the other edge spaced from the hingedly mounted portions 10 and 11 to prevent wind from flowing directly through the respective flue passages.

The food supporting grids 23 and 24 are particularly adapted for cooking meat and the like by grilling, broiling or frying, however, for a complete meal it may be desirable to roast and bake food, such as potatoes wrapped in foil, beans and casseroles in closed containers and it may be desirable to barbecue large ribs, such as beef, in a vertically hanging position, therefore, one of the cooking compartments, for example cooking compartment 6, has a bake chamber therein with the cover 9 being extended vertically to increase the enclosed space within the cooking compartment 6 above the grid 24. A pair of vertically spaced shoulders 39 and 40 are formed on end walls of the upper portion of the cooking compartment 6 to support reticulated shelves 41 and 42 respectively.

For baking, a heat deflecting member or plate 43 is placed on the food supporting grid 24 in the cooking compartment 6 and the heat deflecting plate 43 has edges spaced from the side walls 4 of the same unit 2 whereby convection heat is directed upwardly into the bake chamber within the cooking compartment 6. It is desirable to provide heat indicating means at least in the cover 9 for the bake chamber of the cooking compartment 6 to thereby provide means for visably displaying the temperature value of heat within said bake chamber.

It is desirable to provide handles 44 and 45 on the hingedly mounted portions 10 and 11 respectively and it is particularly desirable to position the handles 44 and 45 to extend beyond opposite ends respectively of the base unit 2 whereby it is possible to open and close the covers 8 and 9 without reaching over the food or the fuel burners 15 and 16.

Particularly for large multiple compartment cooking devices, it is desirable to provide a shelf 46 removably mounted on the base unit 2, as by brackets 47 and 48, engaging the side wall 4 adjacent opposite ends of the cooking device 1. The shelf is particularly useful for supporting condiments, cooking utensils, plates and the like. The shelf also provides a handy work and serving space.

While any suitable fuel burner would produce heat sufficient to heat the ceramic brickets 21, it is preferred to provide a fuel burner operative to produce a uniform heat in the respective compartment, therefore, the burner should produce a substantially continuous flame area when fuel sheets extending therefrom are ignited. In the illustrated cooking device, the fuel burners 15 and 16 each have a plurality of arms 49, each having a substantially continuous fuel port 50 to thereby produce a continuous flame area when fuel sheets extending from the fuel ports 50 are ignited.

A smoke producing device 51 may be mounted within either cooking compartment 5 or 6 and the smoke producing device 51 is particularly adapted for preparing smoked food, such as meat, fish, poultry, and the like, in a manner suitable for human consumption. The smoke producing device 51 is supported on the briquette rack 19 and 20 preferably adjacent one of the side walls 4. The smoke producing device 51 has walls defining a chamber having means therein for supporting suitable smoke producing material, such as charcoal or hardwood products in the form of hickory chips, mesquite chips, sawdust or the like.

In the illustrated structure, a foraminous member 52 is mounted within the smoke producing device 51 and spaced from a tubular member 53 extending from the smoke producing device 51 and through the bottom wall 3 to communicate combustion air into the smoke producing device 51. A lid 54 is provided on the smoke producing device 51 and the lid 54 is adjustable by means of a handle 55 having one end pivotally mounted thereon and an other end extending outwardly through the adjacent side wall 4, preferably at the front of the cooking device 1, to thereby provide means for regulating flow of smoke from the smoke producing device 51. The handle 55 may have a plurality of spaced recesses in a lower edge thereof, whereby the handle may be held in a selected position by moving same downwardly to engage an edge of the side wall 4 within a selected recess.

It is desirable to provide means to prevent unauthorized use of the cooking device 1 while same is unattended, therefore, control knobs 57 and 58 are removable and may be suitably stored until the next use of the cooking device 1.

Rotisserie broiling of ribs and briskets, halves, or quarters of chicken, small roasts, thick steaks and chops, and the like is accomplished using a rotisserie unit having a drive motor 59 mounted on a bracket 60. The drive motor 59 is operative to rotate a spit 61 having one end mounted in the motor 59 and the other end rotatably supported on a bracket 62 within one of the cooking compartments, for example compartment 5. A rotisserie flat basket may be mounted on the spit 61 to support food to be broiled.

It is to be understood that while I have illustrated and described one form of my invention, it is not to be limited to the specific form or arrangement of parts herein described and shown.

What I claim and desire to secure by Letters Patent is:

1. A cooking device comprising:
   a. a base unit having walls defining a plurality of side-by-side compartments each having a bottom wall and an open top, adjacent compartments being separated by a partition, each bottom wall having a plurality of passages therethrough;
   b. a grease drain for each bottom wall;
   c. means in each of said compartments operative to produce heat therein;
   d. a food supporting grid in each of said compartments, said grids each being spaced from said heat producing means and sloped to direct grease toward said grease drain;
   e. a cover for each compartment, each cover having a hingedly mounted portion movable between a closed position and an open position;
   f. a bake chamber in at least one of said compartments;
   g. a flue passage through each cover; and
   h. heat indicating means in the cover of said bake chamber operative to display temperature value of heat therein.

2. The cooking device as set forth in claim 1 including:
   a. a smoke chamber within at least one of said compartments and having means therein for supporting smoke producing material; and
   b. means communicating combustion air into said smoke chamber and means regulating flow of smoke therefrom.

3. The cooking device as set forth in claim 1 wherein:
   a. said heat producing means in each compartment is a fuel burner operative to produce a continuous flame area when fuel sheets extending therefrom are ignited; and
   b. a heat deflecting member is placed on the food supporting grid in the compartment having said bake chamber therein, said heat deflecting member having edges spaced from said walls of said base unit whereby convection heat is directed into said bake chamber.

4. The cooking device as set forth in claim 1 including:
   a. a grease receptacle for each grease drain;
   b. means mounted on said base unit for supporting each grease receptacle;
   c. a trough in each of said bottom walls and shaped to direct grease toward said respective grease drain; and
   d. means on each of said bottom walls at each of the passages therethrough to prevent grease on said respective bottom walls from entering said passages.

5. The cooking device as set forth in claim 1 wherein:
   a. said heat producing means in each compartment is a fuel burner operative to produce a continuous flame area when fuel sheets extending therefrom are ignited;
   b. said passages through each bottom wall provide a source of combustion air for said fuel burner; and
   c. said partition between adjacent compartments is a heat radiating metal whereby operation of the fuel burner in one compartment will heat the adjacent compartment.

6. The cooking device as set forth in claim 5 including:
   a. a grease receptacle for each grease drain;
   b. a support member movably mounted on said base unit for each grease receptacle;
   c. a trough in each of said bottom walls and shaped to direct grease toward said respective grease drain; and
   d. upwardly extending tubular portions at each combustion air passage through each of said bottom walls to prevent grease thereon from flowing through said passages.

7. The cooking device as set forth in claim 6 including:
   a. a smoke chamber within at least one of said compartments and having means therein for supporting smoke producing material;
   b. means communicating combustion air into said smoke chamber and means regulating flow of smoke therefrom, said combustion air communicating means being a tubular member extending through the bottom wall of the respective compartment; and
   c. a heat deflecting plate for placing on the food supporting grid in the compartment having the bake chamber therein, said plate having edges spaced from said walls of said base unit whereby convection heat is directed into said bake chamber.

8. A cooking device comprising:
   a. a base unit having walls defining a plurality of side-by-side compartments each having a bottom wall and an open top, adjacent compartments being separated by a partition, each bottom wall having a plurality of passages therethrough, said passages through each bottom wall providing a source of combustion air;
   b. a grease drain for each bottom wall;
   c. a fuel burner having a plurality of arms each having a substantially continuous fuel port to thereby produce a continuous flame area when fuel sheets extending therefrom are ignited;
   d. a food supporting grid in each of said compartments, said grids each being spaced from said fuel burner and sloped to direct grease toward said grease drain;
   e. a cover for each compartment, each cover having a hingedly mounted portion movable between a closed position and an open position, the hinge for each cover being substantially above said food supporting grid for each compartment;

f. a bake chamber in at least one of said compartments and a heat deflecting plate for placing on the food supporting grid in the compartment having the bake chamber therein, said plate having edges spaced from said walls of said base unit whereby convection heat is directed into said bake chamber;

g. a flue passage through each cover, said flue passage being adjacent each hinge;

h. a handle extending from each cover; and i. a shelf removably mounted on the base unit.

9. The cooking device as set forth in claim 8 including:

a. a smoke chamber within at least one of said compartments and having means therein for supporting smoke producing material;

b. means extending through the bottom wall of the respective compartment for communicating combustion air into said smoke chamber; and c. means mounted on said smoke chamber and extending through one wall of the respective compartment for regulating flow of smoke from the smoke chamber into said compartment.

10. The cooking device as set forth in claim 8 including:

a. a grease receptacle for each grease drain;

b. a support member movably mounted on said base unit for each grease receptacle;

c. a trough in each of said bottom walls and shaped to direct grease toward said respective grease drain; and d. upwardly extending tubular portions at each combustion air passage through each of said bottom walls to prevent grease thereon from flowing through said passages.

11. A cooking device comprising:

a. a base unit having walls defining a plurality of side-by-side compartments each having a bottom wall and an open top, adjacent compartments being separated by a partition, said partition being adapted to radiate heat from one compartment to the other;

b. means in each of said compartments operative to produce heat therein;

c. a food supporting grid in each of said compartments, said grids each being spaced from said heat producing means;

d. a cover for each compartment, each cover being movable between a closed position and an open position;

e. a bake chamber in at least one of said compartments;

f. air passages communicating with a lower portion of each compartment;

g. a flue passage communicating with an upper portion of each compartment.

12. A cooking device as set forth in claim 11 wherein:

a. said heat producing means in each compartment being a fuel burner;

b. said air passages being in the bottom wall and providing a source of combustion air for the respective fuel burner.

13. A cooking device comprising:

a. a base unit having walls defining a plurality of side-by-side compartments each having a bottom wall and an open top, adjacent compartments being separated by a partition, each of said compartments having passages through a wall thereof providing a source of combustion air;

b. a fuel burner having a plurality of arms with fuel ports to produce a substantially continuous flame area when fuel issuing therefrom is ignited;

c. a food supporting grid in each of said compartments, said grids each being spaced from said fuel burner and at substantially the same level;

d. a cover for each compartment, each cover being a hingedly mounted and movable between a closed position and an open position, the hinge for each cover being substantially above said food supporting grid for each compartment;

e. one of said compartments extending to a greater length than the other and having a bake chamber between the respective cover and food supporting grid;

f. means in the bake chamber above the food supporting grid for supporting articles in said bake chamber;

g. a flue passage communicating with an upper portion of each compartment.

14. A cooking device as set forth in claim 13 and including:

a. a heat deflecting plate for support on the food supporting grid in the compartment having the bake chamber therein, said plate having edges spaced from said walls of said base unit whereby convection heat is directed into said bake chamber.

15. A cooking device as set forth in claim 14 and including:

a. a grease drain for each compartment;

b. upwardly extending portions at each combustion air passage to prevent grease on the bottom wall from flowing through said passages.

16. The cooking device as set forth in claim 15 including:

a. a grease receptacle for each grease drain;

b. a support member movably mounted on said base unit for each grease receptacle;

c. a trough in each of said bottom walls and shaped to direct grease toward said respective grease drain.

17. The cooking device as set forth in claim 13 including:

a. a smoke chamber within said compartment having the bake chamber therein; said smoke chamber having means therein for supporting smoke producing material;

b. means extending through the bottom wall of said compartment for communicating combustion air into said smoke chamber; and c. means mounted on said smoke chamber and extending through one wall of said compartment for regulating flow of smoke from the smoke chamber into said compartment.

* * * * *